US012081924B2

(12) United States Patent
Abe et al.

(10) Patent No.: US 12,081,924 B2
(45) Date of Patent: Sep. 3, 2024

(54) OPTICAL NETWORK UNIT, COMMUNICATION NETWORK SYSTEM AND COMMUNICATION METHOD

(71) Applicant: NIPPON TELEGRAPH AND TELEPHONE CORPORATION, Tokyo (JP)

(72) Inventors: Takuya Abe, Musashino (JP); Satoshi Narikawa, Musashino (JP); Tomohiko Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 301 days.

(21) Appl. No.: 17/624,206

(22) PCT Filed: Nov. 26, 2019

(86) PCT No.: PCT/JP2019/046108
§ 371 (c)(1),
(2) Date: Dec. 30, 2021

(87) PCT Pub. No.: WO2021/002036
PCT Pub. Date: Jan. 7, 2021

(65) Prior Publication Data
US 2022/0417625 A1    Dec. 29, 2022

(30) Foreign Application Priority Data

Jul. 2, 2019 (WO) .................. PCT/JP2019/026360

(51) Int. Cl.
*H04Q 11/00*   (2006.01)
*H04L 41/12*   (2022.01)
*H04L 45/02*   (2022.01)

(52) U.S. Cl.
CPC ......... *H04Q 11/0067* (2013.01); *H04L 41/12* (2013.01); *H04L 45/02* (2013.01);
(Continued)

(58) Field of Classification Search
CPC ....... H04Q 11/0067; H04Q 2011/0064; H04Q 2011/0086; H04Q 11/0062; H04L 41/12;
(Continued)

(56) References Cited

U.S. PATENT DOCUMENTS

| 2006/0083245 A1* | 4/2006 | Tanaka | H04L 12/12 370/395.2 |
| 2008/0008192 A1* | 1/2008 | Matoba | H04L 61/103 370/395.54 |
| 2018/0198553 A1* | 7/2018 | Gu | H04L 12/2856 |
| 2023/0122395 A1* | 4/2023 | Abe | H04B 10/27 398/58 |
| 2023/0132674 A1* | 5/2023 | Abe | H04L 12/44 398/58 |

FOREIGN PATENT DOCUMENTS

| JP | 200620240 A | 1/2006 |
| JP | 2006115143 A | 4/2006 |

(Continued)

OTHER PUBLICATIONS

NTT Technology Report, "[GE-PON technology] 4th GE-PON Systematization Function", vol. 17, No. 11, pp. 59-61 (2005).
(Continued)

*Primary Examiner* — Hibret A Woldekidan
(74) *Attorney, Agent, or Firm* — Harness, Dickey & Pierce, P.L.C.

(57) ABSTRACT

An object of the present disclosure is to enable each ONU to generate a plurality of logical paths corresponding to the number of terminal devices connected to the ONU without setting a plurality of MAC addresses in each ONU.

An optical network unit according to the present disclosure includes an ID acquisition unit 26 that acquires ID information unique to a terminal device 94 from the terminal device 94; a virtual MAC address generation unit that
(Continued)

generates a virtual MAC address for the optical network unit by using the acquired ID information; a connection identification unit that generates a logical path between the optical network unit and an optical line terminal by using the generated virtual MAC address as a MAC address for an LLID (Logical Link ID); and a signal processing unit that refers to a table in which the identification information acquired by the virtual MAC address generation unit and the LLID are associated with each other to pass, to the terminal device, data transmitted and received using the logical path generated by the connection identification unit.

6 Claims, 17 Drawing Sheets

(52) U.S. Cl.
CPC ............ *H04Q 2011/0064* (2013.01); *H04Q 2011/0086* (2013.01)

(58) Field of Classification Search
CPC ..... H04L 45/02; H04L 12/4641; H04L 12/44; H04L 41/122; H04B 10/272; H04B 10/27
See application file for complete search history.

(56) References Cited

FOREIGN PATENT DOCUMENTS

| JP | 2006262129 | A | * | 9/2006 |
|----|------------|---|---|--------|
| JP | 200774256  | A |   | 3/2007 |
| JP | 200817278  | A |   | 1/2008 |
| JP | 2014207608 | A |   | 10/2014 |
| JP | 201792556  | A |   | 5/2017 |

OTHER PUBLICATIONS

IEEE Std 802.3-2018, IEEE Standard for Ethernet Section Five, "IEEE 802.3-2018 clause 64", Aug. 31, 2018.
IEEE Std 1904.1-2017, "IEEE Std 1904.1-2017, IEEE Standard for Service Interoperability in Ethernet Passive Optical Networks (SIEPON)", Jul. 24, 2017.
Kazunari Kadotani and Yellow Tail Computer, Gijutsu-Hyoron Co., Ltd., 2016 [Spring][Autumn] Fundamental Information Engineer Pass Teaching Book, first edition, p. 189, May 25, 2016.

* cited by examiner

OPTICAL NETWORK UNIT, COMMUNICATION NETWORK SYSTEM AND COMMUNICATION METHOD

CROSS-REFERENCE TO RELATED APPLICATIONS

This application is a 371 U.S. National Phase of International Application No. PCT/JP2019/046108 filed on Nov. 26, 2019, which claims priority PCT/JP2019,026360, filed on Jul. 2, 2019. The entire disclosures of the above applications are incorporated herein by reference.

TECHNICAL FIELD

The present disclosure relates to a communication device and a communication network for generating a plurality of logical paths using a single ONU in an access network.

BACKGROUND ART

In connecting to a network via an optical transmission line to allow a user to use a network service, the connection to the network is via an optical line terminal (OLT) from an optical network unit (ONU) in a house. (See NPL 1.)

The OLT uses an identifier called LLID (Logical Link ID) to identify the logical path of each ONU. (See NPL 2.)

The ONU has a single MAC (Media Access Control) address, and the OLT assigns a single LLID based on the MAC address of each ONU. The ONU performs authentication based on this LLID and generates a logical path. (See NPL 3.)

Therefore, assigning a plurality of LLIDs and MAC addresses to a single ONU makes it possible for the single ONU to form a plurality of logical paths. (See PTL 1.)

CITATION LIST

Patent Literature

[PTL 1] Japanese Patent Application Publication No. 2007-074256

Non Patent Literature

[NPL 1] "Technology Basic Course [GE-PON Technology] 4th GE-PON Systematization Function", NTT Technical Journal, pp. 59-61, November 2005
[NPL 2] IEEE802.3-2018 clause 64
[NPL 3] IEEE1904.1 SIEPON

SUMMARY OF THE INVENTION

Technical Problem

However, in order to assign the LLIDs, it is necessary to set MAC addresses in the ONU in advance for the number of logical paths to be generated, and thus the number of logical paths cannot be optionally increased.

In other words, in the conventional LLID assignment techniques, since a logical path is generated based on the MAC address assigned in advance to an ONU, it is not possible to generate a plurality of logical paths in a case where a plurality of MAC addresses are not assigned to the ONU. Further, the number of logical paths that can be generated is limited to the number of MAC addresses set in the ONU in advance.

An object of the present disclosure is to enable each ONU to generate a plurality of logical paths corresponding to the number of terminal devices connected to the ONU without setting a plurality of MAC addresses in each ONU.

Means for Solving the Problem

In an optical access network (PON) system according to the present disclosure, an optical network unit (ONU) acquires ID information from a terminal device connected to the ONU, and generates a logical path between the ONU and an optical line terminal (OLT) based on the acquired ID information.

Specifically, an optical network unit according to the present disclosure includes: an ID acquisition unit that acquires ID information unique to a terminal device from the terminal device; a virtual MAC address generation unit that generates a virtual MAC address for the optical network unit by using the acquired ID information; a connection identification unit that generates a logical path between the optical network unit and an optical line terminal by using the generated virtual MAC address as a MAC address for an LLID (Logical Link ID); and a signal processing unit that refers to a table in which the identification information acquired by the virtual MAC address generation unit and the LLID are associated with each other to pass, to the terminal device, data transmitted and received using the logical path generated by the connection identification unit.

Specifically, a communication network system according to the present disclosure includes: the optical network unit according to the present disclosure; and an optical line terminal that acquires the LLID and the virtual MAC address of the connection identification unit from the connection identification unit included in the optical network unit along with an authentication request, and generates, when authentication for the terminal device is successful using the ID information included in the virtual MAC address, a logical path between the optical line terminal and the connection identification unit.

Specifically, a communication method according to the present disclosure is a communication method performed by an optical network unit, and includes: acquiring, by an ID acquisition unit, ID information unique to a terminal device from the terminal device; generating, by a virtual MAC address generation unit, a virtual MAC address for an optical network unit by using the acquired ID information; generating, by a connection identification unit, a logical path between the optical network unit and an optical line terminal by using the generated virtual MAC address as a MAC address for an LLID (Logical Link ID); and referring to, by a signal processing unit, a table in which the identification information acquired by the virtual MAC address generation unit and the LLID are associated with each other to pass, to the terminal device, data transmitted and received using the logical path generated by the connection identification unit.

Effects of the Invention

According to the present disclosure, it is possible to enable each ONU to generate a plurality of logical paths corresponding to the number of terminal devices connected to the ONU without setting a plurality of MAC addresses in each ONU.

BRIEF DESCRIPTION OF DRAWINGS

FIG. 16 is a diagram in which an OLT and an ONU in the third embodiment are focused on.

DESCRIPTION OF EMBODIMENTS

Figure 1:
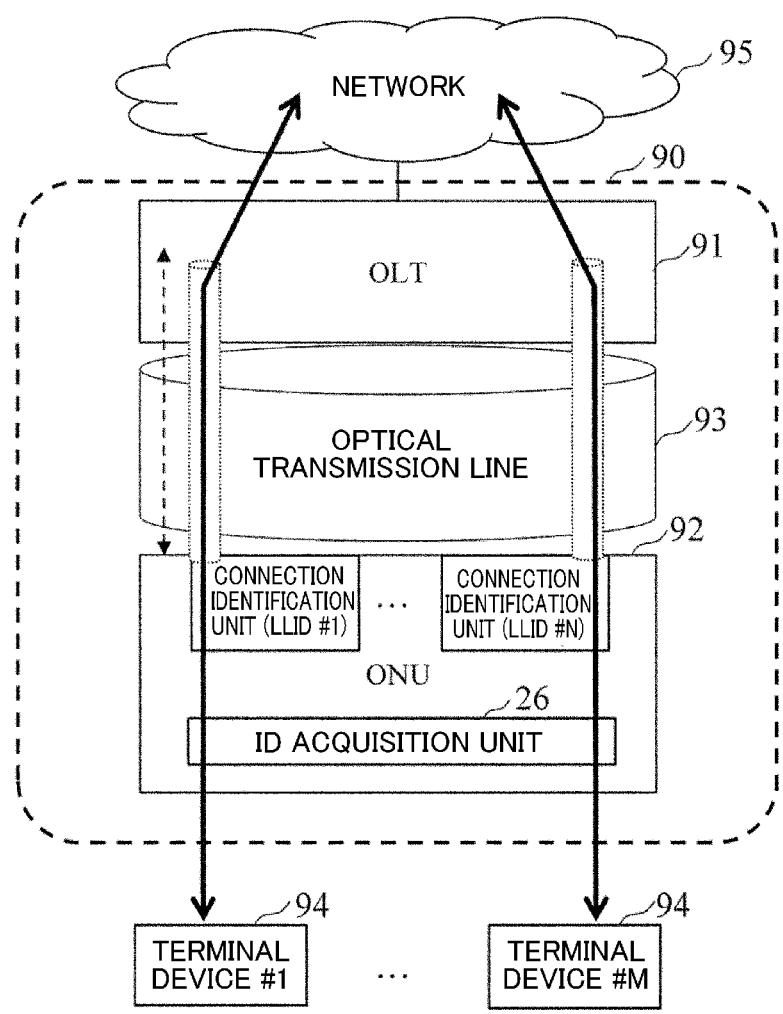
FIG. 1 is a schematic block diagram of a PON system according to the present disclosure.

Embodiments of the present disclosure will be described in detail below with reference to the drawings. Note that the present disclosure is not limited to the embodiments illustrated below. The examples of the embodiments are just examples, and the present disclosure can be implemented in various modifications and improvements based on the knowledge of those skilled in the art. Note that, in the description herein and the drawings, the components having the same reference numerals indicate the same components.

(Overview)

FIG. 1 is a schematic block diagram of a PON system according to the present disclosure. In the PON system according to the present embodiment, an ONU 92 includes an ID acquisition unit 26 for acquiring ID information from a connected terminal device 94, and generates a logical path between the ONU 92 and an OLT 91 by using a MAC address for an LLID based on the acquired ID information. As illustrated in FIG. 1, in the PON system according to the present disclosure, the single ONU 92 has a plurality of LLIDs.

Figure 2:
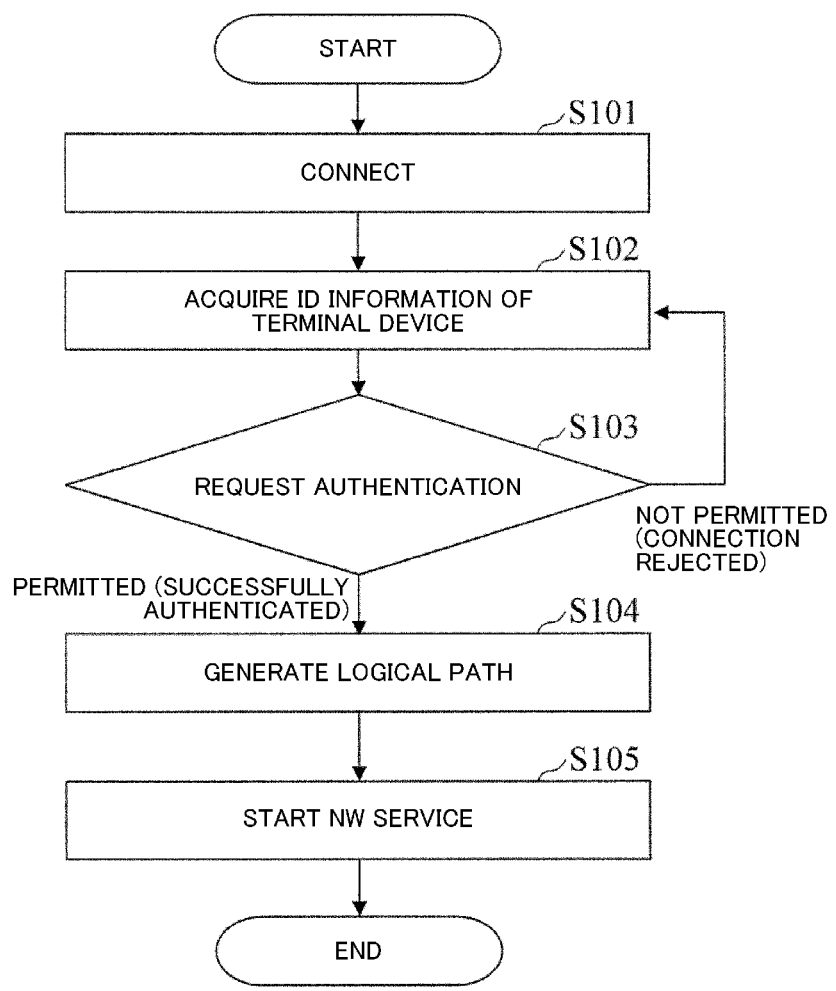
FIG. 2 is a flow from connection of a terminal device to generation of a logical path.

FIG. 2 is a flow from connection of a terminal device to generation of a logical path. Step S101: The terminal device 94 is connected to the ONU 92.

Step S102: The ONU 92 acquires ID information from the terminal device 94.

Step S103: The ONU 92 sends an authentication request based on the ID information of the terminal device 94 to the OLT. At this time, the ONU 92 generates a virtual MAC address by using the ID information, and uses the generated virtual MAC address as a MAC address for an LLID. If the authentication is not successful in the OLT 91 in step S103, the processing returns to step S102 and then the ONU 92 acquires different ID information.

Step S104: If the authentication is successful in the OLT 91, a logical path for the authenticated LLID between the ONU 92 and the OLT 91 is generated.

Step S105: The ONU 92 starts providing a NW service for connecting the terminal device 94 to a network 95.

Figure 3:
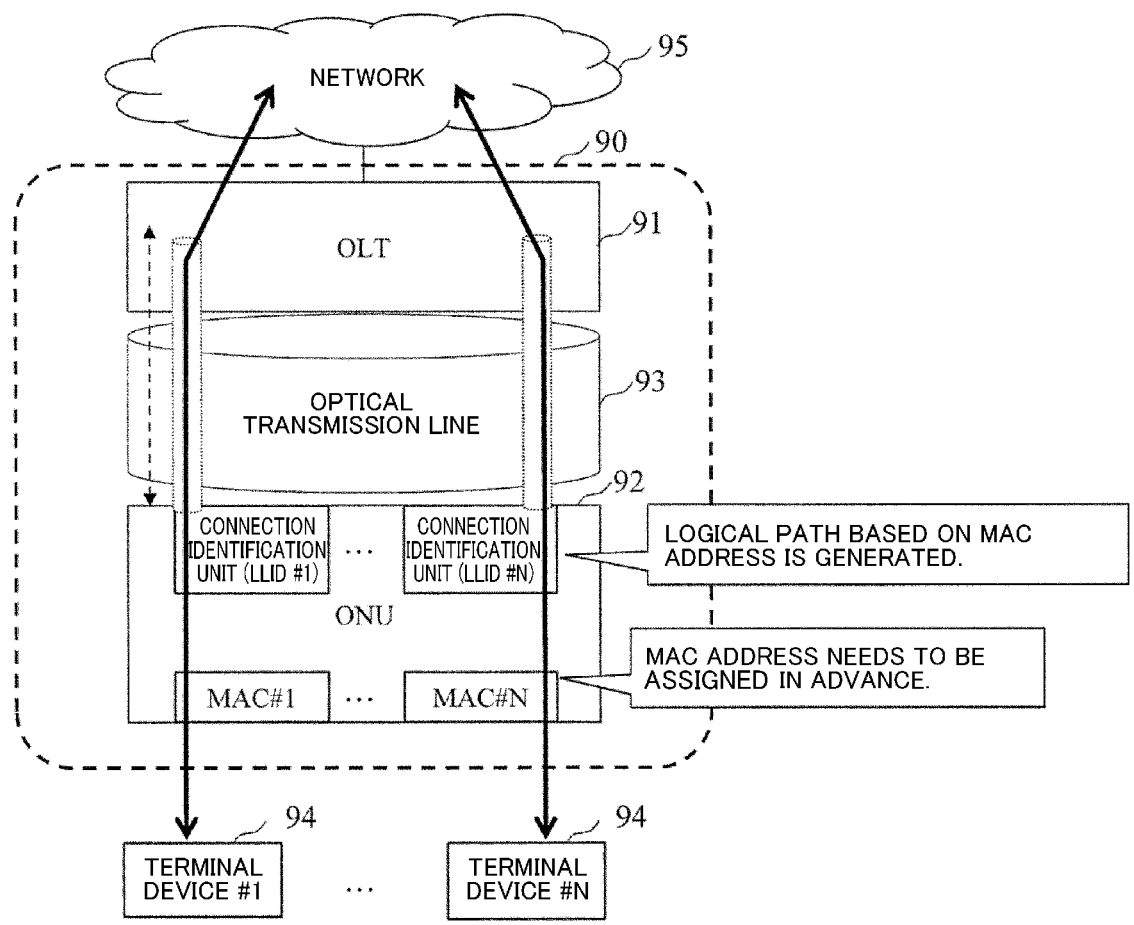
FIG. 3 is a schematic block diagram of a PON system related to the present disclosure.

FIG. 3 is a schematic block diagram of a PON system related to the present disclosure. In the PON system illustrated in FIG. 3, when an ONU 92 attempts to connect a plurality of terminal devices 94 in the multi-LLID technique, it is necessary to assign the same number of MAC addresses as the terminal devices 94 to the ONU 92 in advance. For example, in a case where N terminal devices 94 are to be connected, N MAC addresses are assigned in order to generate N logical paths.

On the other hand, in the present disclosure, authentication is performed using the ID information of the terminal device 94 connected to the ONU 92, and a logical path is generated. Therefore, it is not necessary to assign the same number of MAC addresses as the required logical paths to the ONU 92 in advance.

In the present disclosure, the ONU 92 acquires the ID information of the terminal device 94 and generates a logical path based on the ID information, so that the following are possible.

A plurality of logical paths can be generated without requiring setting MAC addresses for the ONU 92 in advance.

Any number of logical paths can be generated corresponding to the number of IDs of the terminal devices 94.

Further, in the present disclosure, since a terminal device 94 to be connected is associated with a logical path, a NW resource required by the terminal device 94 is determined at the time of generating the logical path, so that the NW resource can be appropriately allocated. For example, when there is a request for a specific NW resource from the terminal device 94, an OLT 91 allocates a NW resource that satisfies the request from the terminal device 94 to the logical path to be generated. When the request from the terminal device 94 is only a connection request, the OLT 91 calculates a NW resource required for the terminal device 94 or uses information registered in advance to allocate a NW resource to the logical path to be generated.

First Embodiment

Figure 4:
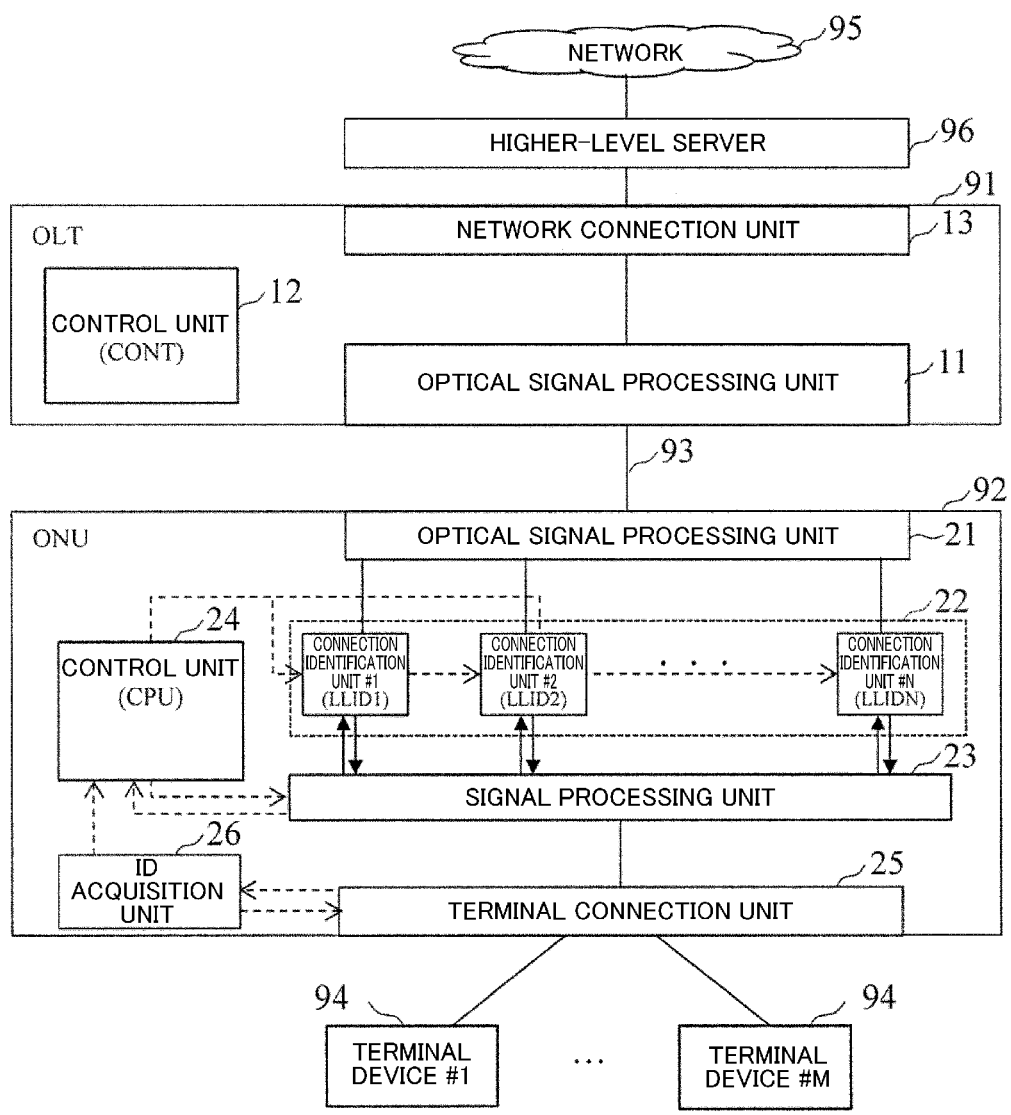
FIG. 4 illustrates a configuration example of a PON system according to a first embodiment.

FIG. 4 illustrates a configuration example of a PON system according to a first embodiment. In the PON system according to the embodiment, an ONU 92 and an OLT 91 are connected by an optical transmission line 93. The OLT 91 is connected to a higher-level server 96, the higher-level server 96 is connected to a network 95, and the ONU 92 is connected to M terminal devices 94.

The terminal device 94 is any device capable of communicating with the ONU 92, such as an IoT (Internet of Things) terminal and a video terminal. In the present embodiment, the number of terminal devices 94 to be connected to the ONU 92 can be any number equal to or less than the number of connection identification units 22.

The OLT 91 includes an optical signal processing unit 11, a control unit 12, and a network connection unit 13. The ONU 92 includes an optical signal processing unit 21, the connection identification units 22, a signal processing unit 23, a control unit 24, a terminal connection unit 25, and an ID acquisition unit 26.

Here, the connection identification unit 22 is provided for each logical path. In the present embodiment, an example is illustrated in which N connection identification units 22 are provided by way of example. The connection identification unit 22 can adopt a software-based configuration using a computer, and any number of connection identification units 22 may be provided corresponding to the number of terminal devices 94. Similarly to the connection identification unit 22, each of the signal processing unit 23, the control unit 24, and the ID acquisition unit 26 can also adopt a software-based configuration using a computer.

The network connection unit 13 has a function of connecting the OLT 91 to the network 95. In the present embodiment, an example is illustrated in which the network connection unit 13 is connected to the higher-level server 96 by way of example. The higher-level server 96 holds the ID information of the terminal device 94 in advance, and functions as an authentication server such as a RADIUS (Remote Authentication Dial-In User Service) server. Specifically, the higher-level server 96 matches the ID information of the connected terminal device 94 with the ID information held by itself, and if it is to be permitted, the higher-level server 96 authenticates the terminal device 94 and gives permission for connection.

Any method for the higher-level server 96 to acquire the ID information may be used, and examples of the method include manual registration and registration by service order (SO) distribution. In respect to the timing for the higher-level server 96 to acquire the ID information, examples include a method of registering before the connection request (pre-registration) and a method of registering in real time via another NW to which the terminal device 94 is connected.

The network 95 is a data communication network. The network 95 may be a private network or a public network, and may include at least one or all of: (a) a metropolitan area network that covers, for example, a certain city, (b) a wide area network that covers regions connected across, for example, urban areas, rural areas, or national boundaries, and (c) the Internet.

The terminal connection unit 25 has a function of connecting the ONU 92 and the terminal device 94. Any network may be used for connecting the ONU 92 and the terminal device 94, and examples include (a) a personal area network that covers, for example, a certain room, (b) a local area network that covers, for example, a certain building, and (c) a campus area network that covers, for example, a certain campus. The connection can be wired or wireless, or a combination thereof.

The optical signal processing unit 11 and the optical signal processing unit 21 have a function of converting an electric signal into an optical signal and vice versa. As a result, the OLT 91 and the ONU 92 transmit and receive optical signals via the optical transmission line 93.

The control unit 12 controls any processing in the OLT 91 for connecting the network 95 and the ONU 92. For example, the control unit 12 has at least one of the following functions.

A function of responding to and registering a request to generate a logical path from each connection identification unit 22 of the ONU 92

A function of exchanging information with the ONU 92 or each connection identification unit 22 of the ONU 92, calculating/allocating resources, and setting various configurations A function of encrypting/decrypting communication with each connection identification unit 22 of the ONU 92

A function equivalent to the higher-level server 96 (For example, a function of authenticating each connection identification unit 22 of the ONU 92 or the terminal device 94 to be connected to each connection identification unit 22. Note that this function is not limited to the case of performing authentication using the higher-level server 96, and may be provided as a function for acquiring the ID information.)

The ID acquisition unit 26 acquires the ID information of the terminal device 94. As the ID information, any identifier for uniquely identifying the terminal device 94 can be used. The ID information may be any identifier for uniquely identifying the terminal device 94, and examples include the following identifiers, and any of them may be used.

MAC address
SIM (Subscriber Identity Module)
IMEI (International Mobile Equipment Identifier)
Phone number
IMSI (International Mobile Subscriber Identity)
ICCID (IC Card Identifier)
Host name
Serial number The control unit 24 controls the connection identification unit 22 and the signal processing unit 23. For example, the control unit 24 functions as a virtual MAC address generation unit to acquire ID information from the ID acquisition unit 26 and generate a virtual MAC address by using the acquired ID information. The virtual MAC address is a combination of any numbers that have the same format as the MAC address of the ONU 92 and can extract the ID information of the terminal device 94.

Each connection identification unit 22 has a unique LLID in the ONU 92, and uses the virtual MAC address generated by the control unit 24 as a MAC address to generate a logical path between the ONU 92 and the OLT 91.

The signal processing unit 23 refers to a table in which a piece of ID information used for generating a logical path and an LLID are associated with each other to pass data received by the connection identification unit 22 to the terminal device 94 corresponding to the ID information associated with the LLID of the connection identification unit 22. Further, the signal processing unit 23 refers to the table to pass data from the terminal device 94 to the connection identification unit 22 having the LLID associated with the ID information of the terminal device 94.

Figure 5:
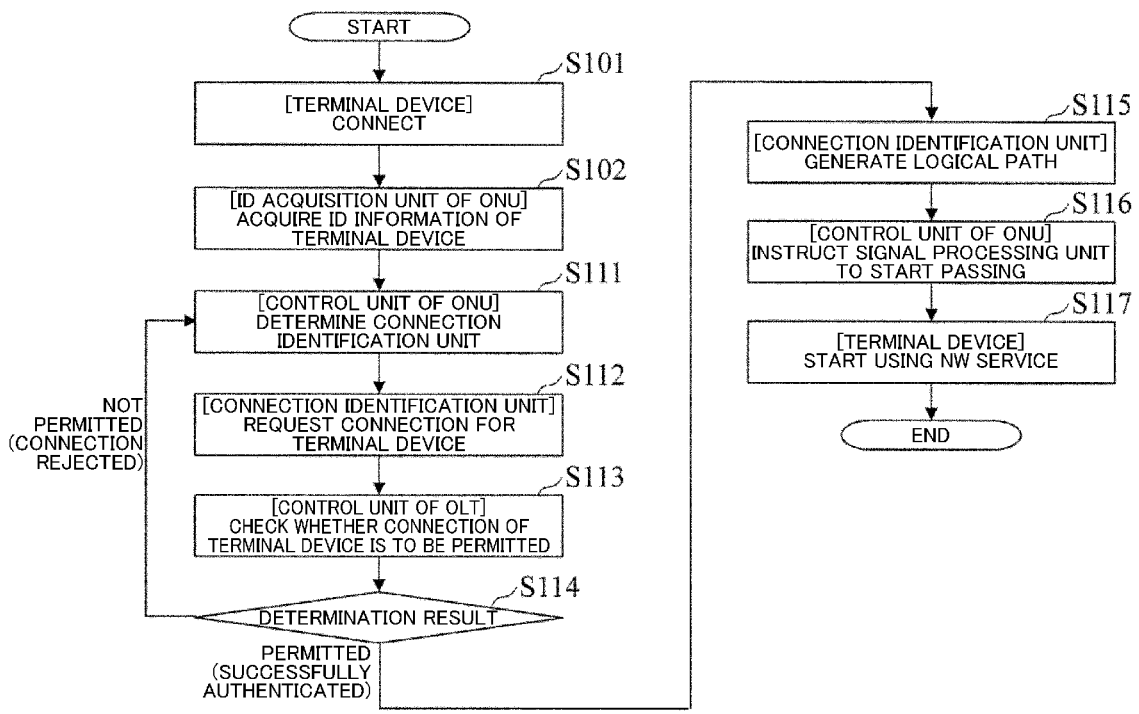
FIG. 5 illustrates an example of a basic flow for connection in the first embodiment.
Figure 6:
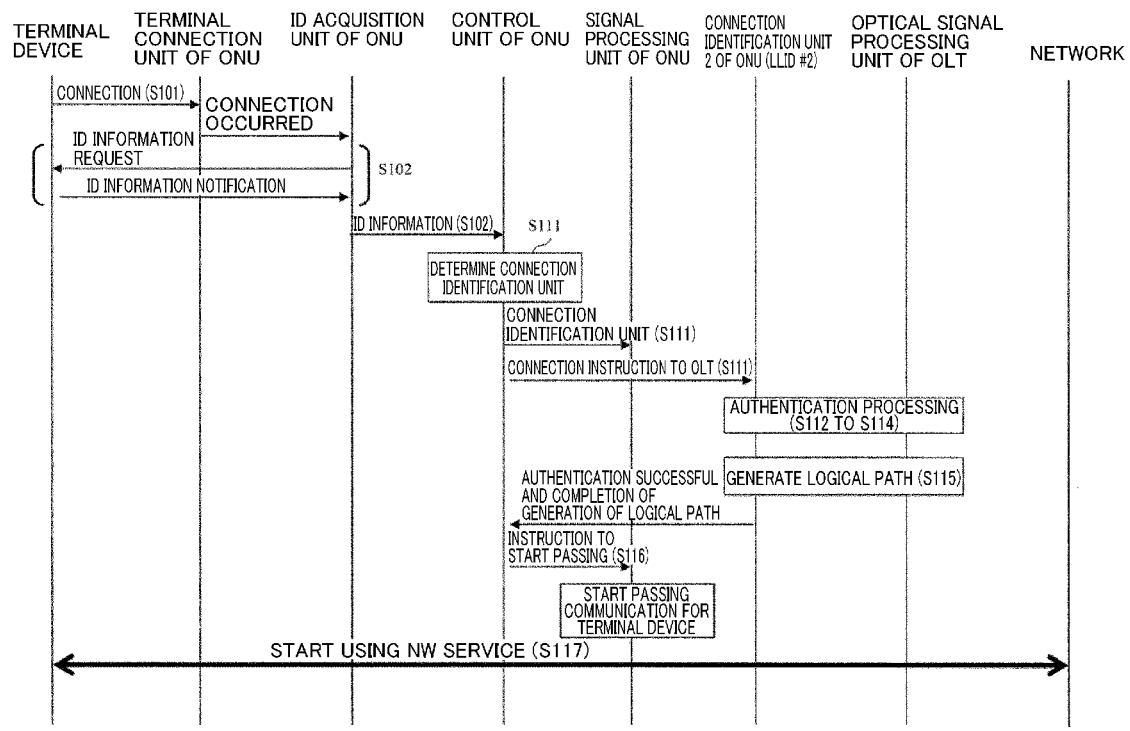
FIG. 6 illustrates a sequence diagram for connection in the first embodiment.

FIG. 5 illustrates an example of a basic flow for connection in the present embodiment. FIG. 6 illustrates a sequence diagram. The operation for connection in the present embodiment will be described with reference to FIGS. 5 and 6. Step S101: The terminal device 94 is connected to the ONU 92. Step S102: The ID acquisition unit 26 included in the ONU 92 acquires the ID information from the terminal device 94 and notifies the control unit 24 of the ID information of the terminal device 94.

Step S111: The control unit 24 determines a connection identification unit 22 #2 to be connected to the OLT 91. Then, the control unit 24 acquires the ID information from the ID acquisition unit 26, and generates a virtual MAC address for the connection identification unit 22 #2 by using the ID information of the terminal device 94. The control unit 24 instructs the determined connection identification unit 22 #2 to perform connection using the virtual MAC address. The control unit 24 also notifies the signal processing unit 23 of the LLID and ID information of the connection identification unit 22 #2.

Step S112: The connection identification unit 22 #2 sends a request for connection with the terminal device 94 to the OLT 91. At this time, the connection identification unit 22 #2 sends an authentication request to the OLT 91.

Step S113: The control unit 12 of the OLT 91 performs authentication for the terminal device 94 using the LLID and virtual MAC address received from the connection identification unit 22 #2 to check whether or not the connection is permitted. When the connection identification unit 22 #2 acquires the result of authentication from the OLT 91, the connection identification unit 22 #2 notifies the control unit 24 of the result of authentication.

Step S114: If the result of authentication from the OLT 91 is a response indicative of being successful, the processing in the control unit 24 proceeds to step S115. On the other hand, if it is indicative of not being successful, the processing proceeds to step S111. In this case, in step S111, the control unit 24 determines a connection identification unit 22 #1 different from the connection identification unit 22 #2.

Here, the number of pieces of ID information acquired by the ID acquisition unit 26 in step S102 may be any number equal to or larger than 1. Further, in step S111, any number of pieces of ID information and any combination thereof may be used by the control unit 24 to generate the virtual MAC address. The ID information may have a priority order used for generating a virtual MAC address. Examples of the operations of the ID acquisition unit 26 and the control unit 24 in steps S102 and S111 include the following by way of example.

In step S102, the ID acquisition unit 26 acquires a plurality of pieces of ID information at a time, and in step S111, the control unit 24 generates a virtual MAC address by using a piece of ID information with a specific priority. If the authentication is not successful in response to the connection request, the control unit 24 sequentially generates virtual MAC addresses by using a piece of ID information determined based on its priority.

In step S102, the ID acquisition unit 26 acquires a plurality of pieces of ID information at a time, and in step S111, the control unit 24 generates a virtual MAC address by using a combination of the pieces of ID information, and performs authentication using the virtual MAC address. In the authentication, matching for each piece of ID information included in the virtual MAC address is performed. In this case, the connection destination in higher level than the OLT 91 may be changed based on the result of matching for the pieces of ID information.

In the present disclosure, if the connection is to be rejected in step S114, the processing may return to step S102.

In step S102, the ID acquisition unit 26 acquires information with a specific priority for various pieces of ID information. Steps S102 to S114 are sequentially repeated until the authentication is successful in step S114.

In step S102, the ID acquisition unit 26 performs a plurality of acquisition methods for the same ID information with a specific priority. Steps S102 to S114 are sequentially repeated while changing the acquisition method in the ID acquisition unit 26 until the authentication is successful in step S114.

Step S115: The connection identification unit 22 #2 generates a logical path between the ONU 92 and the OLT 91. When the logical path is generated, the connection identification unit #2 notifies the control unit 24 that the generation of the logical path is completed. At this time, the connection identification unit #2 may also notify the control unit 24 that the result of authentication is indicative of being successful.

Step S116: The control unit 24 instructs the signal processing unit 23 to start passing between the connection identification unit 22 #2 and the terminal device 94.

Step S117: The use of a NW service in the terminal device 94 is started.

The above-described steps of processing performed by the OLT 91 and ONU 92 complete the connection processing for the terminal device 94. Note that the authentication processing may be performed after the logical path is generated or at the same time as the logical path is generated.

Figure 7:
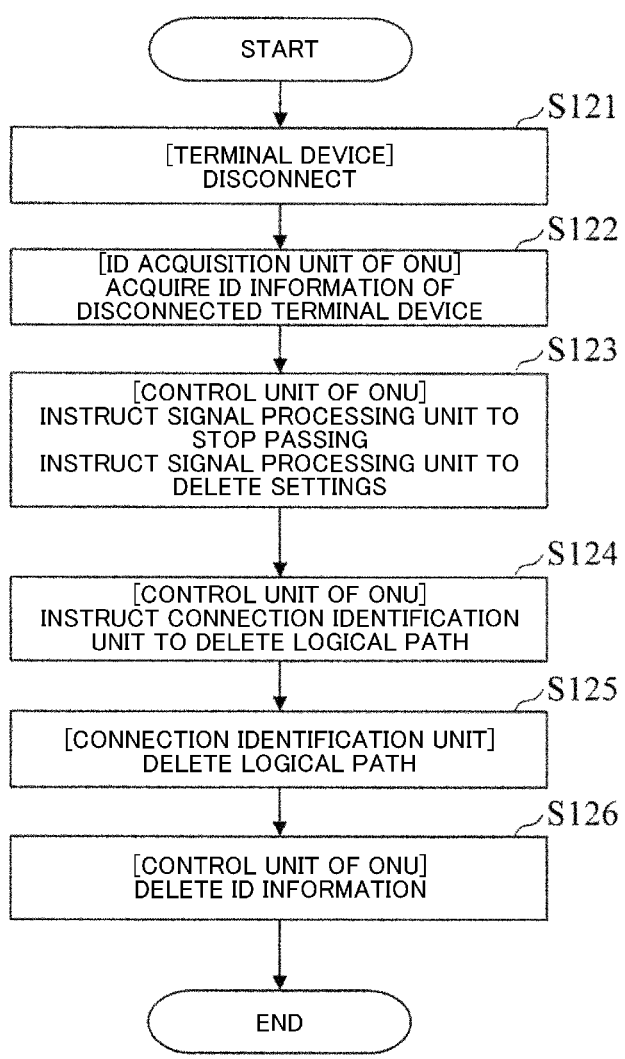
FIG. 7 illustrates an example of a basic flow for disconnection in the first embodiment.
Figure 8:
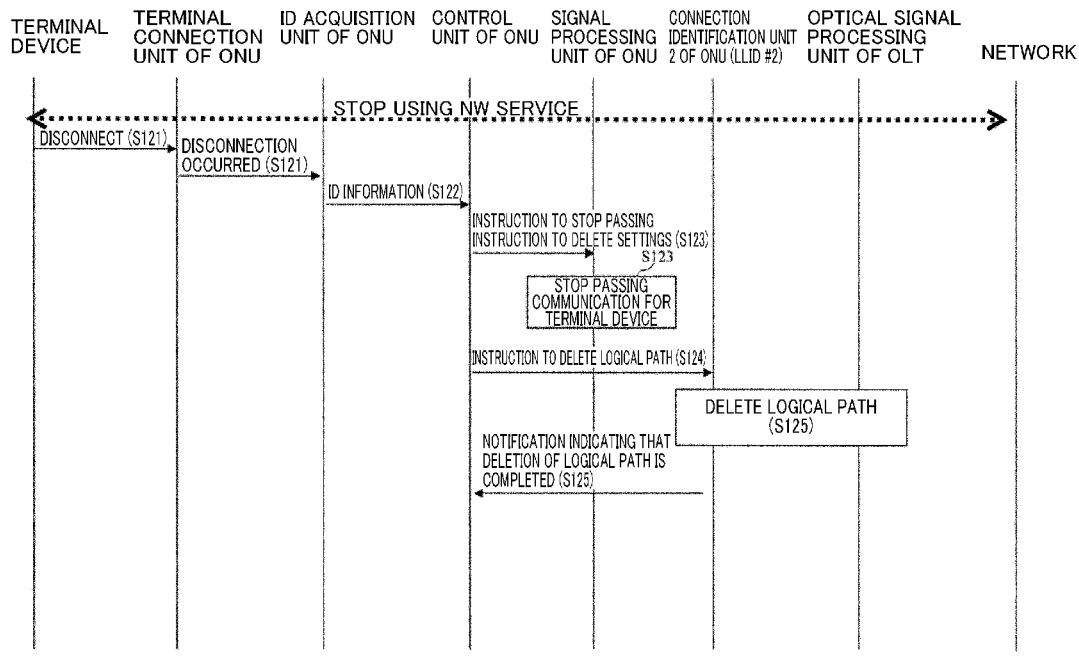
FIG. 8 illustrates a sequence diagram for disconnection in the first embodiment.

FIG. 7 illustrates an example of a basic flow for disconnection in the present embodiment. FIG. 8 illustrates a sequence diagram. The operation for disconnection in the present embodiment will be described with reference to FIGS. 7 and 8.

Step S121: The terminal device 94 is disconnected. Then, the terminal connection unit 25 detects the disconnection of the terminal device 94 and notifies the ID acquisition unit 26 of the occurrence of the disconnection.

Step S122: The ID acquisition unit 26 acquires the ID information of the disconnected terminal device 94 from the terminal connection unit 25 and notifies the control unit 24 of the acquired ID information.

Step S123: The control unit 24 provides a pass stop instruction and a setting deletion instruction to the signal processing unit 23. Here, the pass stop instruction includes a control command to stop the passing, the LLID for which the passing is stopped, and the ID information of the terminal device 94 associated with the LLID. The setting deletion instruction includes a control command for deleting the settings and the LLID of the connection identification unit 22 for which the settings are deleted.

Step S124: The control unit 24 instructs the connection identification unit 22 for which the passing is stopped to delete the ID information of the terminal device 94.

Step S125: The connection identification unit 22 deletes the logical path in accordance with the instruction from the control unit 24. The above-described steps of processing performed by the OLT 91 and ONU 92 complete the disconnection processing for the terminal device 94.

In the examples of FIGS. 7 and 8, in step S122, ID information is acquired when the terminal device 94 is disconnected. The ID information to be acquired here may be different from the ID information at the time of connection. There are roughly two patterns in which ID information needs to be acquired when the terminal device 94 is disconnected.

Pattern 1. A case where the terminal device 94 is directly connected to the ONU 92

In this case, since the terminal device 94 can directly recognize the disconnection, it is not necessary to newly transmit the ID information from the terminal device 94. Therefore, as the "ID information" in step S122, information for determining a physical disconnection such as a physical MAC address can be used.

Pattern 2. A case where the terminal device 94 is not directly connected to the ONU 92

In this case, since the ONU 92 cannot directly recognize the disconnection of the terminal device 94, the following methods can be considered.

- The ID information of the terminal device 94 to be disconnected by the ID acquisition unit 26 is acquired by causing the terminal device 94 to provide notice of the ID information at the time of disconnection.
- The OLT 91, the higher-level server 96, the ONU 92, or other device performs polling or the like for the terminal device 94, and determines the disconnection of the terminal device 94 based on the status of a response to the polling. The device that has performed the polling for the terminal device 94 notifies the ONU 92 of the ID information of the terminal device 94.

Here, any method of acquiring the ID information in the ONU 92 may be used in step S102, and examples include the following.

- As illustrated in FIG. 6, when the terminal device 94 is connected, the ONU 92 sends a request to the terminal device 94, and the terminal device 94 responds the request.
- When the terminal device 94 is connected, the terminal device 94 may notify the ONU 92.

Further, examples of the method for the ID acquisition unit 26 to acquire the ID information in step S102 include the following methods, and any of them may be used.

- The content of "a frame received from the terminal device 94" is examined and extracted such as an ARP (Address Resolution Protocol) frame or DHCP (Dynamic Host Configuration Protocol). This makes it possible to acquire the MAC address and IP address of the terminal device 94.
- The SIP Registration of the terminal device 94 is acquired. This makes it possible to acquire the MAC address, telephone number, host name, and serial number of the terminal device 94.
- A request for information is sent to the terminal device 94 by using UPnP (Universal Plug and Play), and the content of a response frame from the terminal device 94 is examined and extracted. Any protocol may be used for the request for information, and examples include the SOAP (Simple Object Access Protocol), SSDP (Simple Service Discovery Protocol), HTTP (Hyper TextTransfer Protocol), TCP (Transmission Control Protocol), and UDP (User Datagram Protocol). This makes it possible to acquire the MAC address, SIM, IMEI, telephone number, IMSI, ICCID, host name, and serial number.
- The content of an authentication request from the terminal device is examined and extracted by using the AKA (Authentication and Key Agreement) or an EAPOL (Extensible Authentication Protocol over LAN) packet defined in 802.1X. Any method of acquiring for this case may be used, and examples include direct acquisition in the ONU 92 that functions as an authentication server, and acquisition of, by using extended OAM (Operations, Administration, Maintenance) from the OLT 91, information received from the OLT 91 or the higher-level server 96 that is connected between the OLT 91 and the network 95 to function as an authentication server. This makes it possible to acquire the ID information as in the case of using UPnP.

In determining a connection identification unit 22 in step S111, the control unit 24 associates the terminal device 94 with the connection identification unit 22. For example, an association rule (for each terminal device, type, service, or the like) is pre-registered for the OLT 91 or the higher-level server 96, and the association is performed based on information from the terminal device 94. Alternatively, the association is sequentially performed with unused connection identification units 22 on a per terminal device 94, type, or service basis, or the like. Here, the method of setting the rule may be setting from the OLT 91 by extended OAM or the like, or may be setting by downloading from a device in higher level than the OLT 91 such as the higher-level server 96.

Examples of the method of applying the ID information to the generation of the logical path in step S111 include the following methods.

Figure 9:
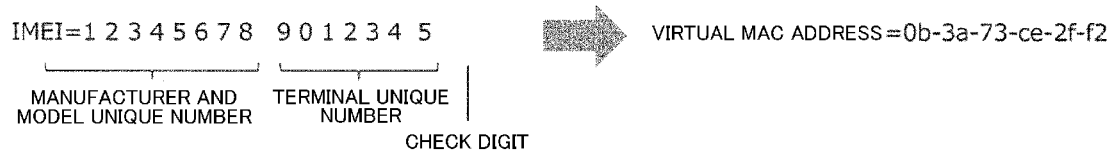
FIG. 9 illustrates a method of generating a virtual MAC address.

- A virtual MAC address is generated by associating the physical MAC address of the ONU 92 with the ID information of the terminal device 94. For example, the MAC address of the ONU 92 and the ID information of the terminal device 94 are combined to generate a virtual MAC address, which is used to identify and authenticate the terminal device 94.
- A new virtual MAC address is generated only from the ID information of the terminal device 94 without associating the physical MAC address of the ONU 92 with the ID information of the terminal device 94. For example, as illustrated in FIG. 9, a number up to 14 digits of the IMEI (maximum 15 digits, decimal number) of the terminal device 94 excluding the last 1 digit serving as a check digit is converted into a hexadecimal number (to pad the high-order digit(s) with zero(s) if the resulting number is less than 12 digits) to generate a virtual MAC address, which is used to identify and authenticate the terminal device 94.

Any method of authenticating the terminal device 94 in step S113 may be used. For example, the control unit 12 extracts the ID information of the terminal device 94 from the virtual MAC address acquired from the connection identification unit 22 #2, and determines whether or not the connection is to be permitted based on whether or not the extracted ID information is stored in the higher-level server 96 in advance. If the extracted ID information is stored in the higher-level server 96 in advance, it is determined that the connection is to be permitted, and if the extracted ID information is not stored in the higher-level server 96 in advance, it is determined that the connection is rejected.

The check whether or not the connection of the terminal device 94 is to be permitted in step S113 may be determined by other than the OLT 91. For example, the OLT 91 transfers a connection request sent from the ONU 92 to the higher-level server 96, and responds to the ONU 92 based on a response result from the higher-level server 96.

The connection identification unit 22 #1 for making a connection request may be prepared in advance, and in step S113, the connection identification unit 22 #1 may make a connection request from the connection identification unit 22 #2 to the OLT 91. In that case, the control unit 12 of the OLT 91 performs authentication for the LLID and virtual MAC address of the connection identification unit 22 #2, and if the authentication is successful, the control unit 12 generates a logical path between the OLT 91 and the connection identification unit 22 #2. This makes it possible to generate a logical path between the connection identification unit 22 #2 and the OLT 91.

As described above, in the present embodiment, a logical path is generated using a virtual MAC address generated from the ID information of each terminal device 94. Therefore, in the present embodiment, the ONU 94 can generate a plurality of logical paths corresponding to the number of terminal devices 94 connected to the ONU 94 without setting MAC addresses in the ONU 94 in advance.

Second Embodiment

Figure 10:
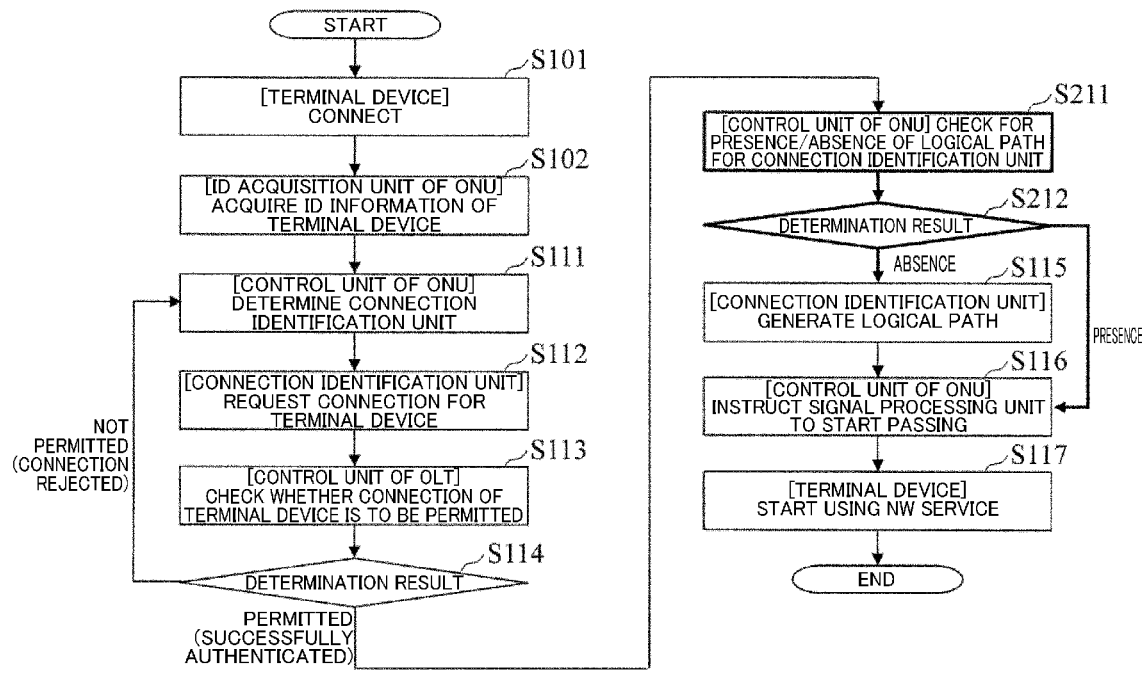
FIG. 10 illustrates an example of a basic flow for connection in a second embodiment.
Figure 11:
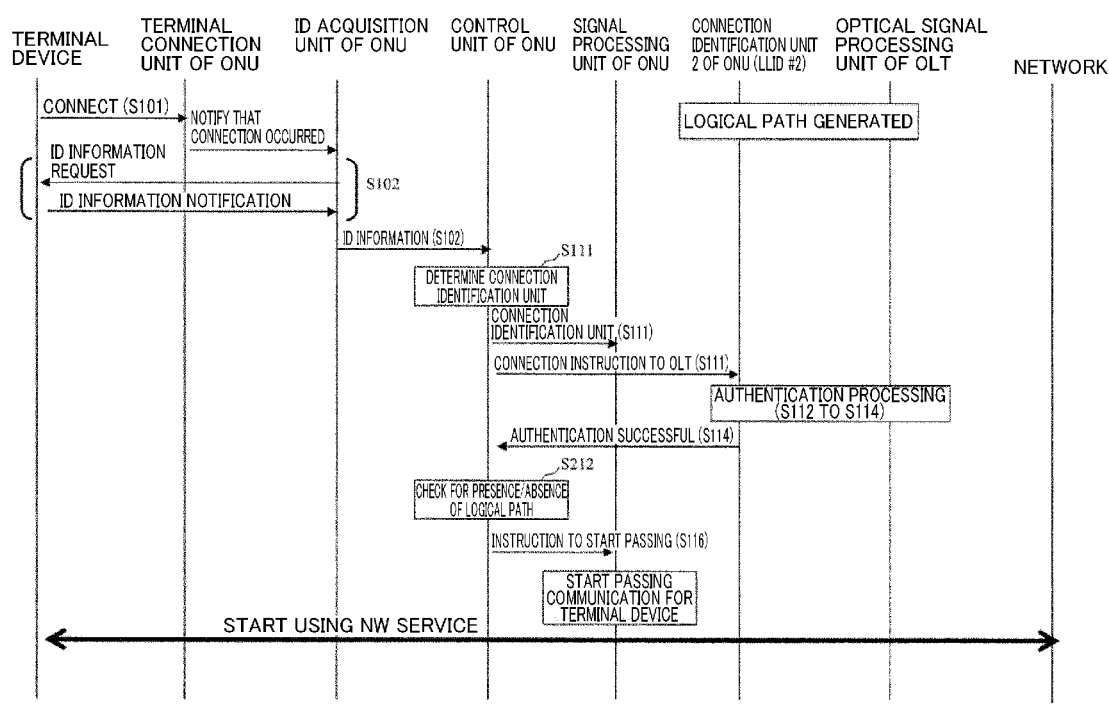
FIG. 11 illustrates a sequence diagram for connection in the second embodiment.

Ina case where a plurality of terminal devices 94 are connected to the ONU 94, they typically generate different logical paths but may use a common logical path. FIG. 10 illustrates a processing flow in that case. FIG. 11 illustrates a sequence diagram. In the present embodiment, steps S211 to S212 are inserted between steps S114 and S115.

In step S114, if the result of authentication from the OLT 91 is a response indicative of being successful, the processing proceeds to step S211.

Step S211: The control unit 24 determines whether or not a logical path has already been set for the authenticated connection identification unit 22. If it has not been set yet, step S115 is performed as in the first embodiment, and the connection identification unit 22 generates a logical path. If it has already been set, step S115 is skipped and the processing proceeds to step S116.

Figure 12:
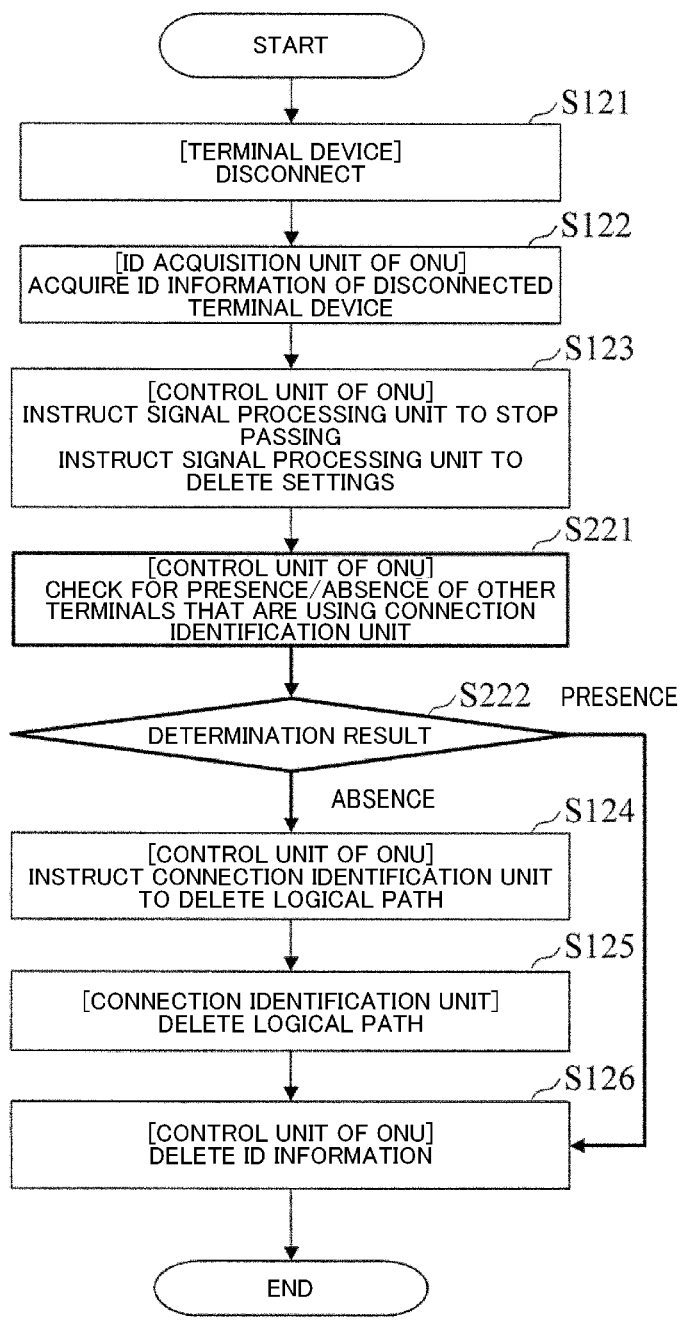
FIG. 12 illustrates an example of a basic flow for disconnection in the second embodiment.
Figure 13:
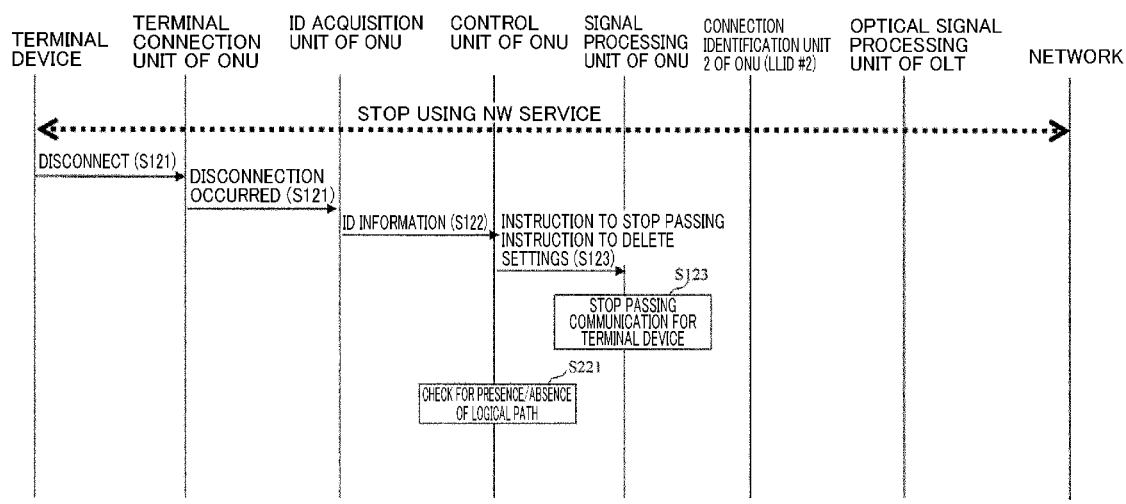
FIG. 13 illustrates a sequence diagram for disconnection in the second embodiment.

FIG. 12 illustrates an example of a basic flow for disconnection in the present embodiment. FIG. 13 illustrates a sequence diagram. The operation for disconnection in the present embodiment will be described with reference to FIGS. 12 and 13. In the present embodiment, steps S221 to S222 are inserted between steps S123 and S124.

Step S221: When the control unit 24 acquires the ID information of the disconnected terminal device 94 from the terminal connection unit 25, the control unit 24 checks whether or not another terminal device 94 is using a logical path in the corresponding connection identification unit 22.

Step S222: When the other terminal device 94 is not using a logical path, the processing proceeds to step S124. When the other terminal device 94 is using a logical path, the processing proceeds to step S126.

In the processing of determining a connection identification unit 22 in step S111 in the present embodiment, a terminal device 94 that can use a common logical path and a connection identification unit 22 are associated with each other. For example, the logical path to be transferred is changed depending on the terminal device 94.

In particular, when a shared logical path (a logical path that has already been generated) is used, the association rule can include the following two patterns.

(1) The same ID information is assigned to the same connection identification unit 22.
(2) Different ID information is assigned to a connection identification unit 22 based on the association rule.

Either (1) or (2) can be implemented by setting the association rule to the ONU 92 in advance.

Here, the method of setting the rule may be setting from the OLT 91 by extension or the like, or may be setting by downloading from the higher-level server 96 on the network 95 side from the OLT 91.

In this way, according to the present disclosure, a single ONU 92 has a plurality of LLIDs therein. Then, the ONU 92 acquires ID (SIM, IMEI, IMSI, etc.) information unique to each of a plurality of terminal devices 94 connected to the ONU 92 from the terminal devices 94, and uses the acquired information to identify the terminal device 94. Thus, according to the present disclosure, it is possible to establish a new logical link for connecting the terminal device 94 to an OLT 91 without using conventionally required information such as the MAC address/IP address/ToS/CoS/port of a terminal to be connected. Further, according to the present disclosure, it is possible to connect the plurality of terminal devices 94 to the OLT 91 by using the single ONU 92. Further, it is possible to change the logical link condition for each terminal device 94.

Note that, in the first embodiment and the second embodiment, an example is described in which one logical path is set in one terminal device 94, but the present disclosure is not limited to this, and various forms are possible depending on the application executed by the terminal device 94. Specifically, it corresponds to a configuration in which a router 97 illustrated in FIGS. 19 and 20 referred to in a third embodiment described later is omitted.

Figure 19:
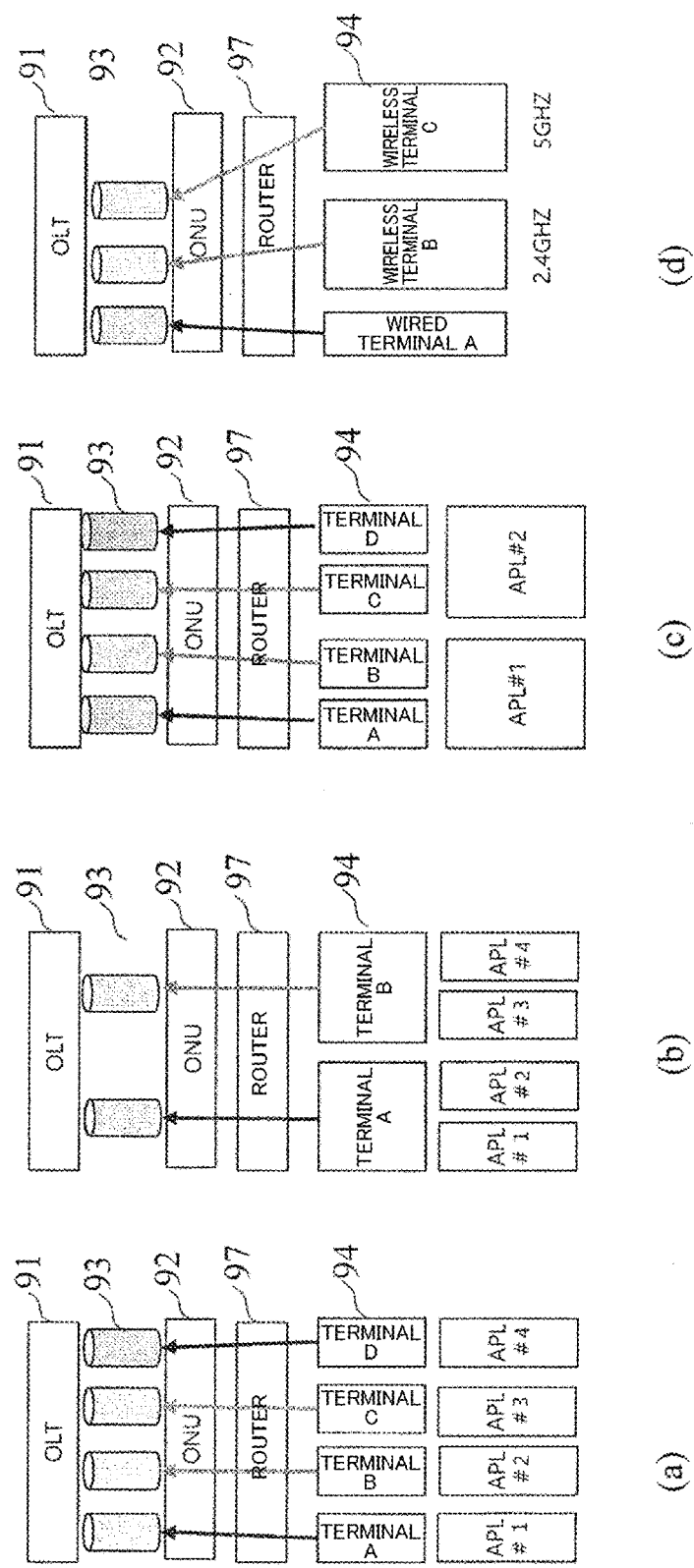
FIG. 19 illustrates examples of logical paths for respective terminal devices.

For example, in the configuration corresponding to FIG. 19, in a case where one terminal device 94 executes one or more applications, the ONU 92 may generate one logical path for the one or more applications. In a case where a plurality of terminal devices 94 execute a common application, the ONU 92 may generate a logical path for each terminal device 94. Note that, instead of each terminal device 94, the generation of a logical path may be performed for each group of terminal devices or each type of terminal device 94. Further, the ONU 92 may generate a different logical path for each method of connection between the terminal device 94 and the router 97 (WiFi, wired, etc.).

Figure 20:
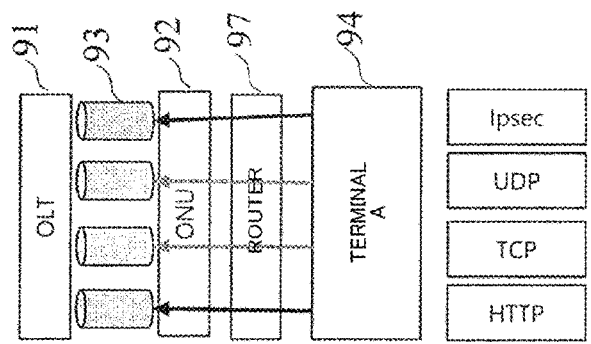
FIG. 20 illustrates examples of logical paths for respective services.
Figure 20:
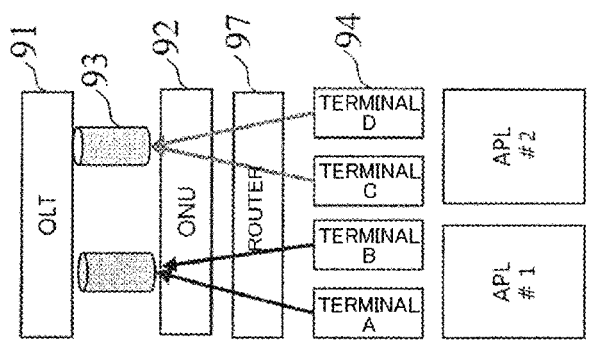
Figure 20:
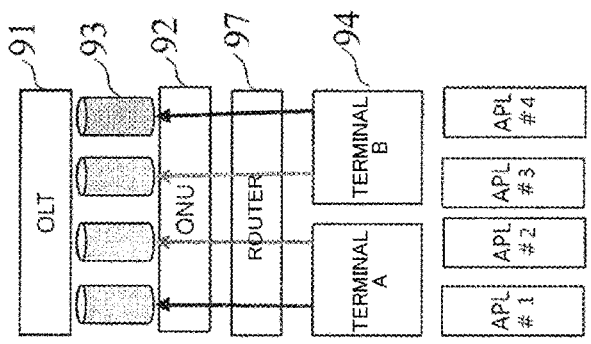
Figure 20:
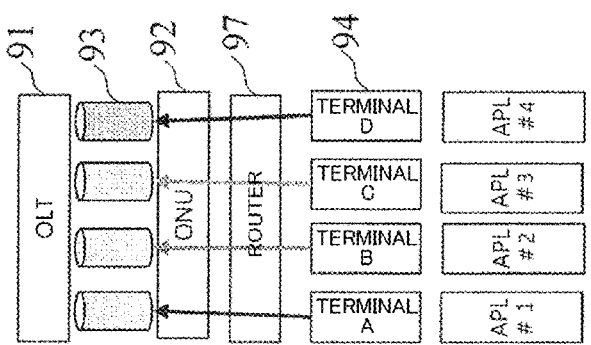

For example, in the configuration corresponding to FIG. 20, in a case where one terminal device 94 executes one or more applications, the ONU 92 may generate one or more logical paths depending on the application(s). In a case where a plurality of terminal devices 94 execute a common application, the ONU 92 may generate a logical path shared among the plurality of terminal devices 94. Note that, instead of each application, the generation of a logical path may be performed for each group of applications or each type of application. Further, the ONU 92 may generate different logical paths for respective communication protocols for one terminal device 94.

Third Embodiment

Figure 14:
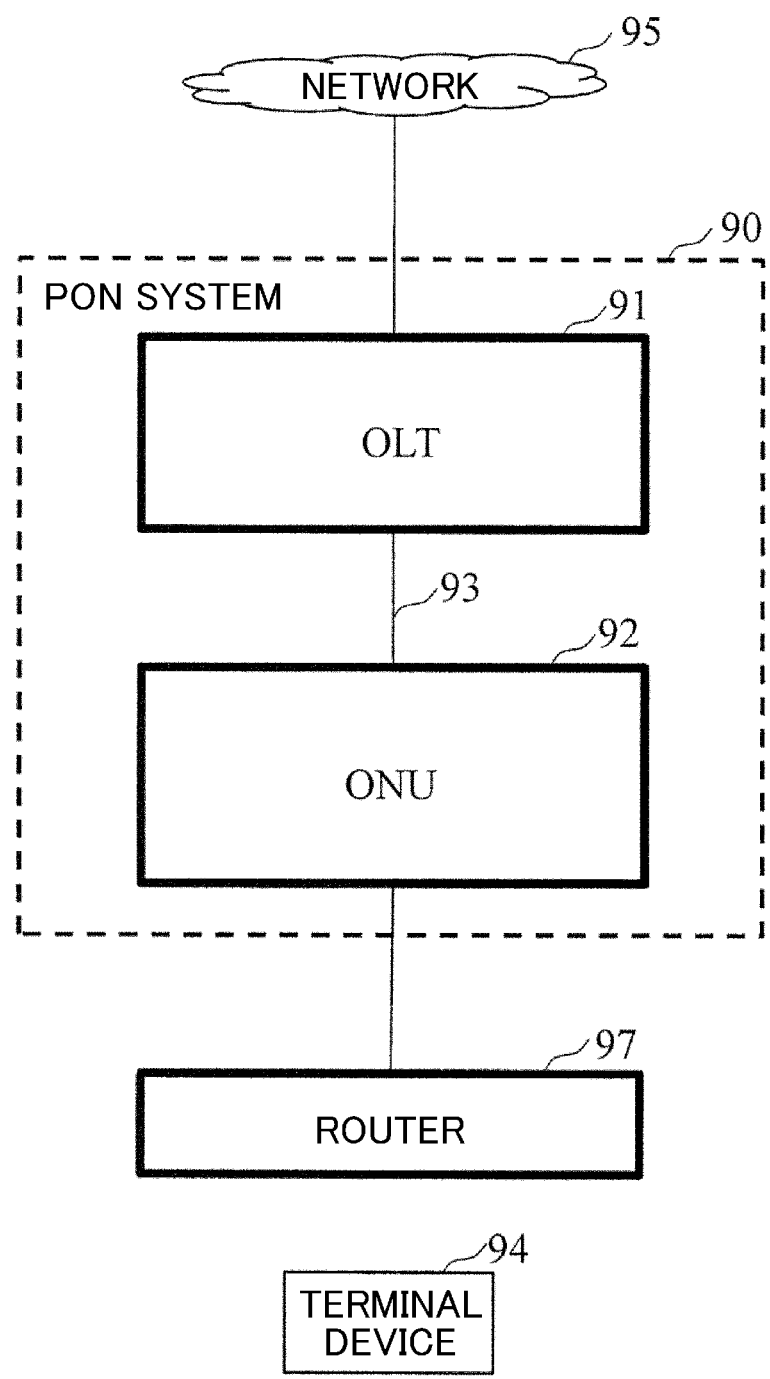
FIG. 14 illustrates a configuration example of a system according to a third embodiment.

FIG. 14 illustrates a configuration example of a system according to the present embodiment. The system according to the present embodiment includes a terminal device 94 of a user, a router 97, a PON system 90, and a network 95. The PON system 90 includes an ONU 92, an optical transmission line 93 in an optical subscriber line section, and an OLT 91. The terminal device 94 is connected to the router 97 via a wired or wireless medium. The router 97 is communicatively connected to the ONU 92 via a wired or wireless medium. The ONU 92 is communicatively connected to the OLT 91 via the optical transmission line 93 in the optical subscriber line section.

The router 97 is a device that connects the terminal device 94 to the ONU 92, and includes a NAPT (Network Address Port Translation/IP masquerade/Port Address Translation) device and a home gateway device.

Generally, it is conceivable to acquire information in an ARP request from the terminal device 94 and use the MAC address of the terminal device 94 or the like as ID information. However, in that case, only the directly connected terminal device 94 is targeted, and it cannot be applied to an environment in which a plurality of terminal devices 94 are connected via the router 97. Therefore, a method is required in which the ONU 92 can acquire the ID information of the terminal device 94 even through the router 97. Further, typically, an ONU does not examine a packet that is not addressed to the ONU itself.

Figure 15:
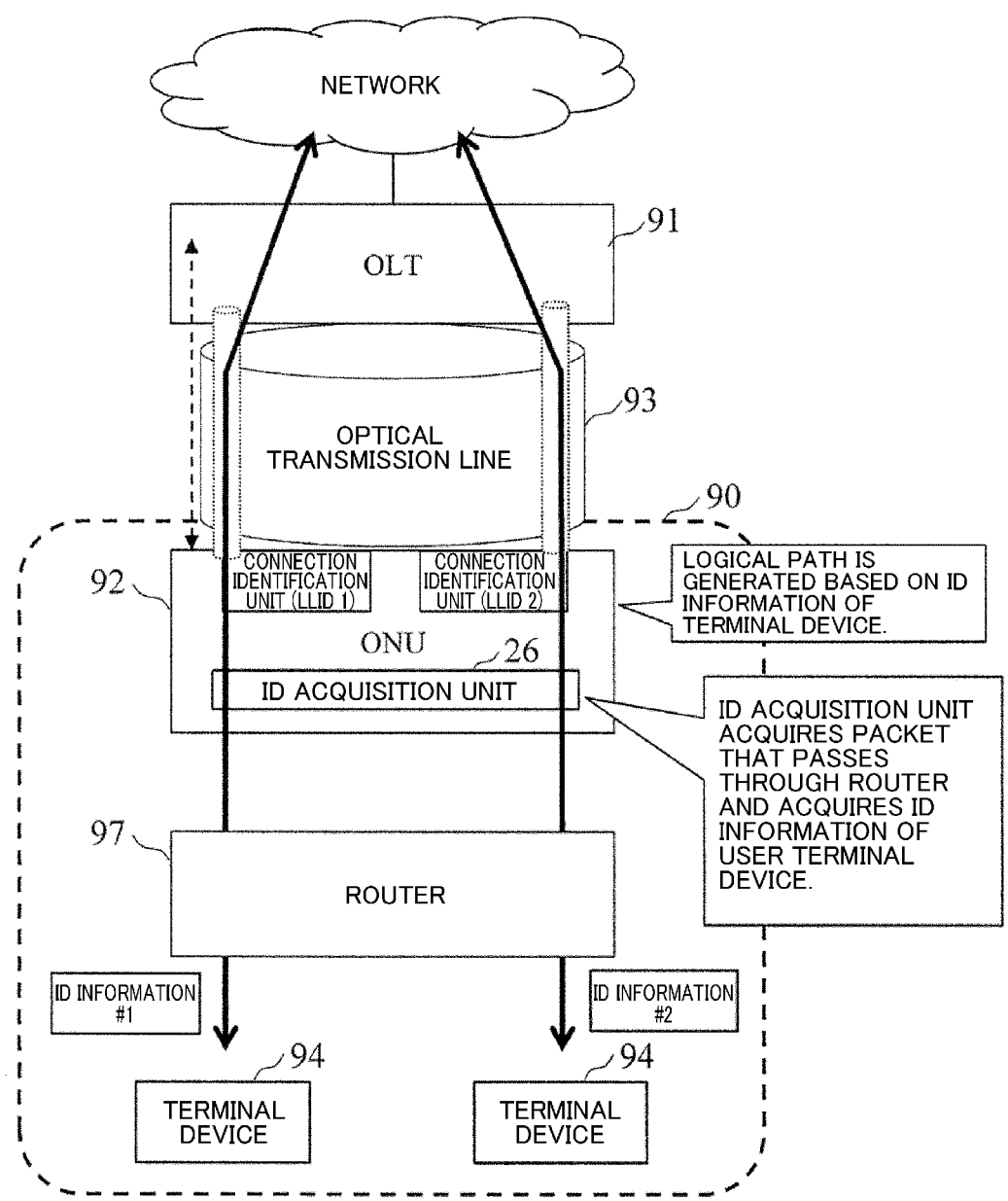
FIG. 15 is a schematic block diagram of a PON system in the third embodiment.

FIG. 15 is a schematic block diagram of a PON system according to the present embodiment. A network device such as the router 97 transmits a packet, such as an 802.1X authentication packet, which forwards the ID information of the terminal device 94 to the higher-level network 95 as it is. Therefore, the ONU 92 of the present disclosure has a function (ID acquisition unit 26) of examining such a packet and acquiring the ID information of the terminal device 94. Any means for examining the packet may be used, and an example is a capture function such as the network analyzer software "WireShark". The ONU 92 generates a virtual MAC address for generating a logical path from the acquired ID information, and generates and manages the logical path for each terminal device 94. In the present embodiment, a case is described in which the network device is the router 97, but the present disclosure is not limited to this. Examples of the network device include any device, such as a home gateway, which has a function of forwarding a packet from the terminal device 94 to the higher-level network 95.

Examples of the packet for forwarding the ID information of the terminal device 94 to the upper network 95 as it is include a RADIUS Access-Request. In this case, the ONU 92 acquires the following information from the "RADIUS Access-Request".

First ID information example: The ONU 92 reads "USER-NAME" in the Attribute to identify the terminal (or user). As a result, a logical path is generated for each terminal device 94 (or user).

Second ID information example: The ONU 92 reads "NAS-IP-Address" in the Attribute to identify the authentication destination service from the authentication server IP address. As a result, a logical path is generated for each service.

FIG. 19 illustrates examples of logical paths for the respective terminal devices 94 (or users). A logical path for each terminal device 94 is, for example, for one application for each terminal device 94, as illustrated in (a) of FIG. 19. In a case where one terminal device 94 executes a plurality of applications, the ONU 92 may generate one logical path for the plurality of applications, as illustrated in (b) of FIG. 19. Further, in a case where a plurality of terminal devices 94 execute a common application, the ONU 92 may generate a logical path for each terminal device 94, as illustrated in (c) of FIG. 19. Note that, instead of each terminal device 94, the generation of a logical path may be performed for each group of terminal devices or for each type of terminal device 94. Further, the ONU 92 may generate a different logical path for each method of connection between the terminal device 94 and the router 97 (WiFi, wired, etc.) as illustrated in (d) of FIG. 19. Further, the present disclosure is applicable to even a configuration in which any device, such as the router 97, for connecting the terminal device 94 to the ONU 92 is not provided, described in the first embodiment and the second embodiment.

FIG. 20 illustrates examples of logical paths for respective services. An application is, for example, one application for each terminal device 94, as illustrated in (a) of FIG. 20. In a case where one terminal device 94 executes a plurality of applications, the ONU 92 may generate a plurality of logical paths corresponding to the applications for the terminal device 94, as illustrated in (b) of FIG. 20. Further, in a case where a plurality of terminal devices 94 execute a common application, the ONU 92 may generate a common logical path for the terminal devices 94, as illustrated in (c) of FIG. 20. Note that, instead of each application, the generation of a logical path may be performed for each group of applications or each type of application. Further, the ONU 92 may generate different logical paths for respective communication protocols for one terminal device 94, as illustrated in (d) of FIG. 20. Further, the present disclosure is applicable to even a configuration in which any device, such as the router 97, for connecting the terminal device 94 to the ONU 92 is not provided, described in the first embodiment and the second embodiment.

Even in a case where the router 97 such as a home gateway is interposed between the ONU 92 and the terminal device 94 with no logical path between the ONU 92 and the OLT 91 being generated, the ONU 92 of the present embodiment can acquire the ID information of the terminal device 94, and the acquired ID information can be used to generate a logical path between the OLT 91 and the ONU 92. As a result, by allocating a logical path for each terminal device 94, allocation of a different band and priority control can be performed for each terminal device 94 even under the same ONU 92.

Figure 16:
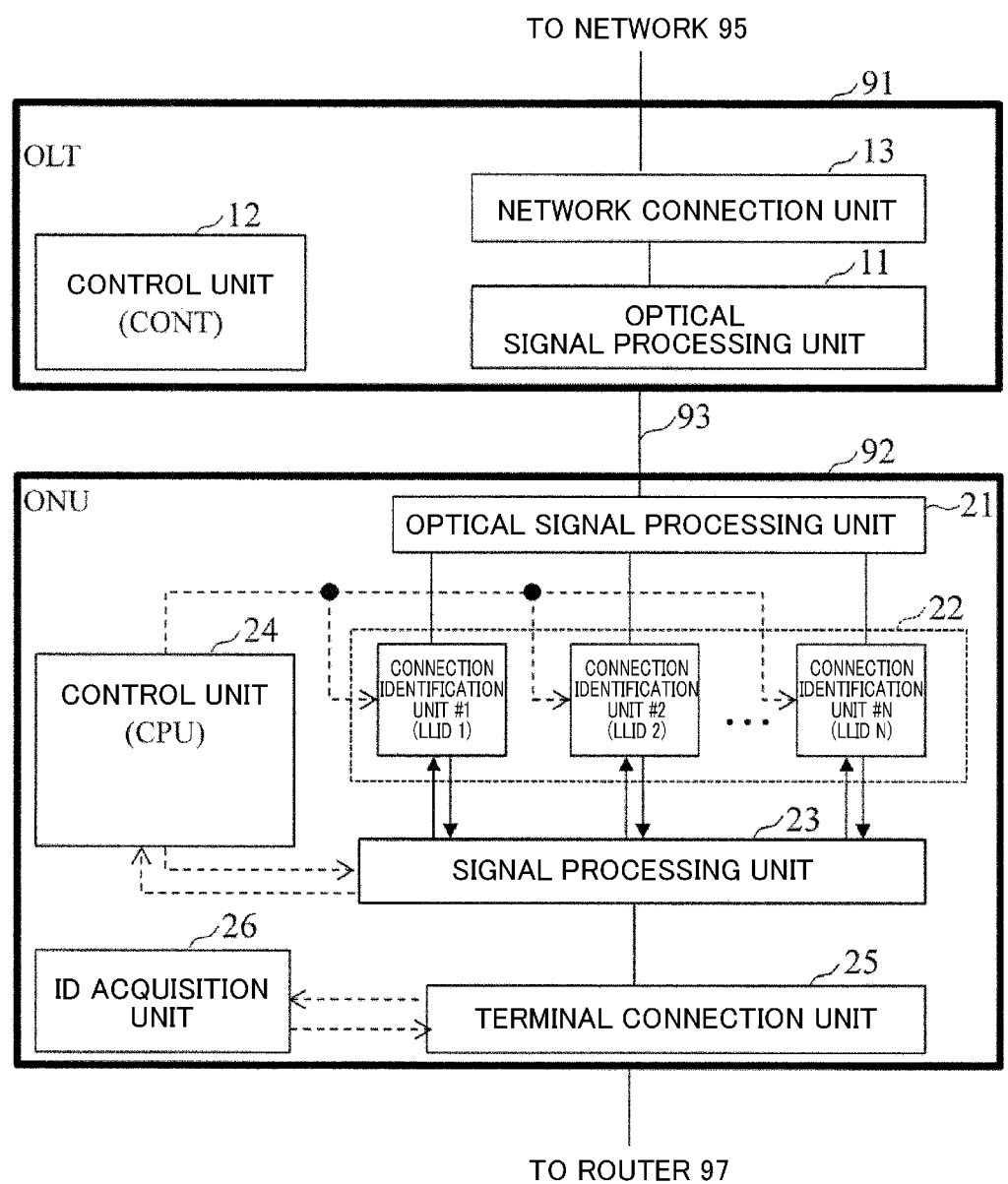

FIG. 16 is a diagram in which the OLT 91 and the ONU 92 according to the embodiment are focused on. The OLT 91 includes the optical signal processing unit 11, the control unit 12, and the network connection unit 13. The ONU 92 includes the terminal connection unit 25, the signal processing unit 23, the control unit 24, the connection identification unit 22 (#1, #2, . . . , #N (N is an integer of 2 or more)), and the optical signal processing unit 21, and the ID acquisition unit 26.

[Configuration of ONU]

The terminal connection unit 25 is communicatively connected to the router 97 via a wired or wireless medium. Further, the terminal connection unit 25 is connected to the signal processing unit 23. The signal processing unit 23 is connected to the terminal connection unit 25. Further, the signal processing unit 23 is communicatively connected to the optical signal processing unit 21 in pairs via N connection identification units 22 (#1 to #N). Further, the signal processing unit 23 is communicatively connected to the control unit 24. The control unit 24 is communicatively connected to the signal processing unit 23. Further, the control unit 24 is communicatively connected to each of the N connection identification units 22 (#1 to #N). The control unit 24 includes, for example, a processor such as a CPU (Central Processing Unit). The optical signal processing unit 21 is communicatively connected to the signal processing unit 23 in pairs via the N connection identification units 22 (#1 to #N). Further, the optical signal processing unit 21 is communicatively connected to the OLT 91 via the optical transmission line 93 in the optical subscriber line section.

Note that the connection identification unit 22 identifies the terminal device or the like based on, for example, an LLID, but not limited to this. For example, a configuration may be provided in which a connection identification unit that performs identification based on information different from the LLID and a connection identification unit that performs identification based on the LLID are combined.

[Configuration of OLT]

The optical signal processing unit 11 is communicatively connected to the ONU 92 via the optical transmission line 93 in the optical subscriber line section. Further, the optical signal processing unit 11 is communicatively connected to the network connection unit 13. The control unit 12 includes, for example, a processor such as a CPU. The network connection unit 13 is communicatively connected to the optical signal processing unit 11.

Figure 17:
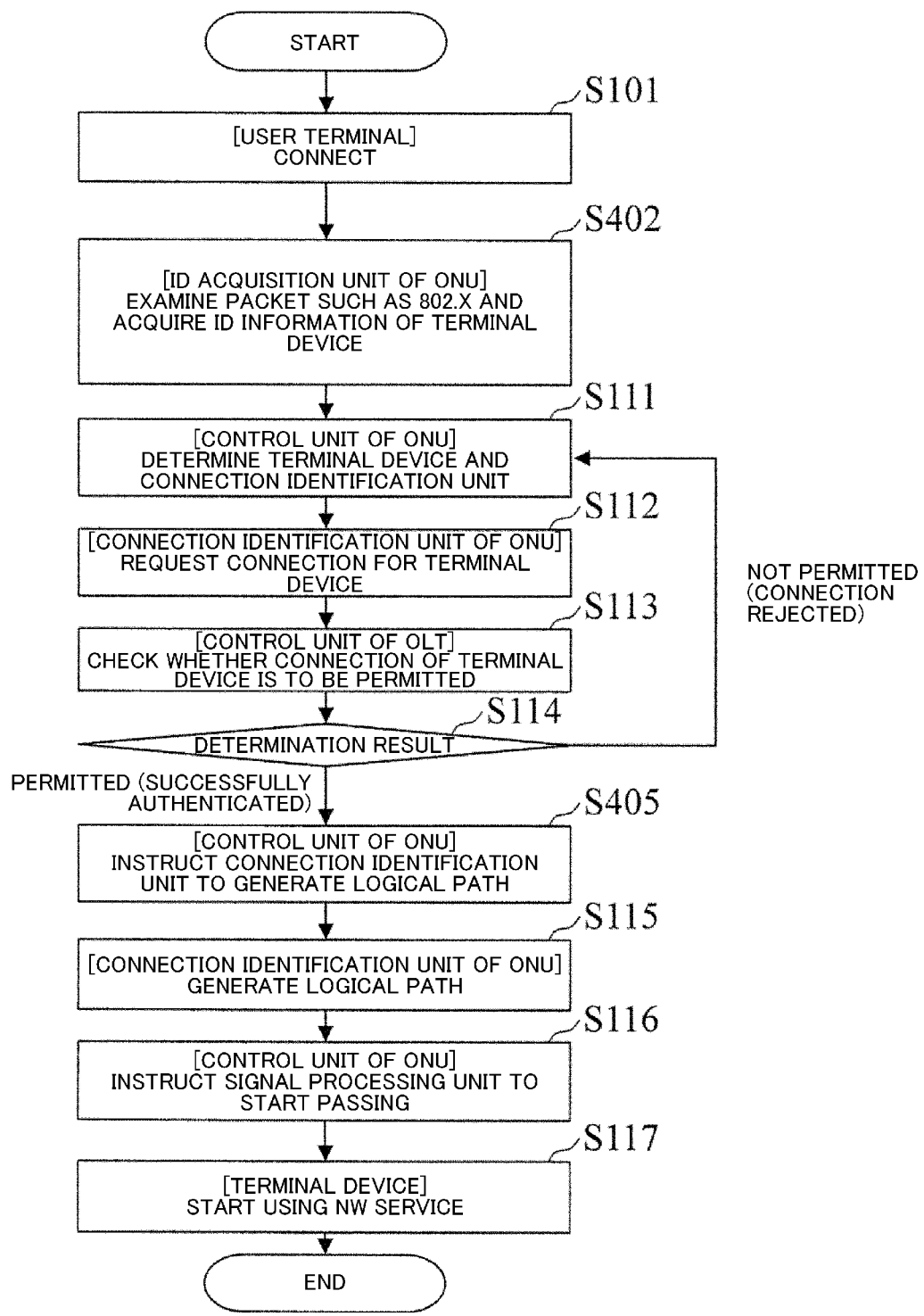
FIG. 17 illustrates an example of a basic flow for connection in the third embodiment.
Figure 18:
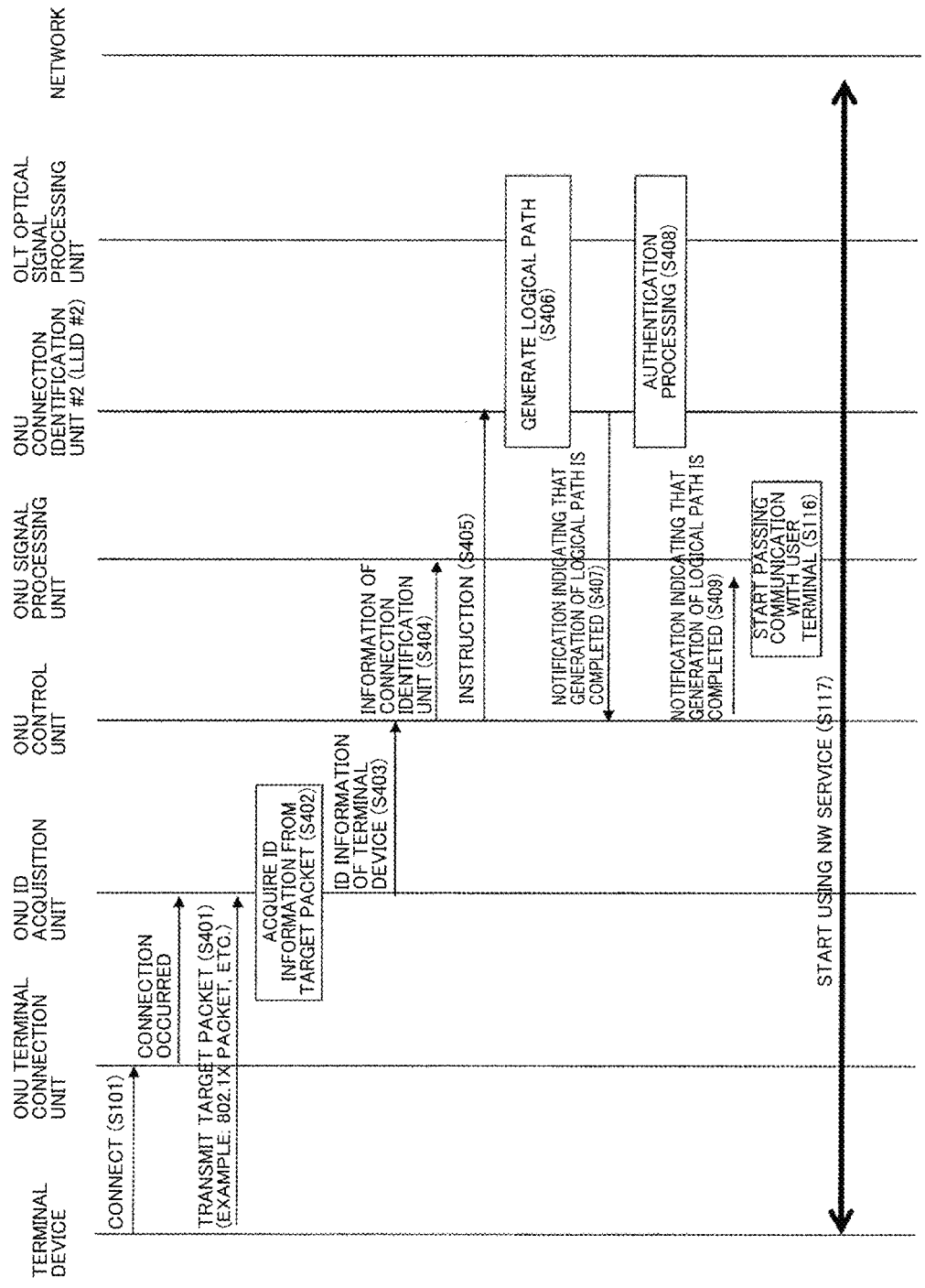
FIG. 18 illustrates a sequence diagram for connection in the third embodiment.

FIG. 17 illustrates an example of a basic flow for connection in the present embodiment. FIG. 18 illustrates a sequence diagram.

When the terminal device 94 is connected to the terminal connection unit 25 (S101), an authentication packet such as an 802.1X packet is transmitted from the terminal device 94 to the network 95 side.

Next, the ID acquisition unit 26 examines the packet transmitted from the terminal device 94 to the network 95 side to acquire the ID information of the terminal device 94 (S402), and notifies the control unit 24 of the acquired ID information (S403). The control unit 24 determines a connection identification unit 22 #2 to be connected (S111) based on the ID information of the terminal device 94, and notifies the connection identification unit 22 #2 of that. The connection identification unit 22 #2 transmits a connection request to the OLT 91 based on the ID information of the terminal device 94 (S112). In response to this, an authentication scheme for determining whether or not the connection from the terminal device 94 to the network 95 is to be permitted is started.

In the authentication scheme, a logical path between the connection identification unit 22 #2 and the optical signal processing unit 11 is generated (S406), and when the logical path is generated, the connection identification unit 22 #2 sends a completion notification indicating that the generation of the logical path is completed to the control unit 24 (S407), and authentication processing (S408) is performed. At this time, based on the connection request information from the ONU 92 (S113), the control unit 12 determines whether or not the connection is to be permitted (S114). Further, for the logical path in step S406, terminal ID information obtained by MPCP Discovery is used instead of the MAC address. Further, the authentication processing (S408) may be performed before the logical path is generated or at the same time when the logical path is generated.

Note that, in the present embodiment, an example is described in which the determination of whether or not the connection is to be permitted in the OLT 91 is performed, but the present disclosure is not limited to this. For example, the determination may be performed based on preset "ID information of the terminal device for which the connection is to be permitted", or the determination may be performed in a manner that transfers ID information to the higher-level server (reference numeral 96 illustrated in FIG. 4) and uses a response result from the higher-level server 96. Further, determination conditions may include, in addition to whether or not the connection of the terminal device 94 itself is to be permitted, a condition based on a relationship with other logical paths (e.g., fairness of band allocation, etc.). Further, the control unit 24 may generate a virtual MAC address based on the ID information while the connection identification unit 22 #2 may transmit a connection request to the OLT 91 based on the virtual MAC address.

If the result of determination in step S114 indicates that the connection is not to be permitted, the control unit 12 sends to the control unit 24 a setting instruction to the signal processing unit 23 (hereinafter, referred to as "signal processing unit setting instruction") along with the result of determination indicating that the connection is not to be permitted. Next, the control unit 24 instructs the signal processing unit 23 that the connection is not to be permitted and that the connection is rejected. After that, the signal processing unit 23 rejects the communication connection with the terminal device 94.

If the result of determination in step S114 indicates that the connection is to be permitted, the control unit 12 sends to the control unit 24 an activation instruction to the connection identification unit 22 #2 (hereinafter, referred to as "connection identification unit activation instruction") and the signal processing unit setting instruction along with the result of determination indicating that the connection is to be permitted. Next, the control unit 24 notifies the connection identification unit 22 #2 of an instruction to causes the optical signal processing unit 21 to establish a connection to a new logical path (S405). The connection identification unit 22 #2 generates a new logical path in accordance with the notified instruction and then establishes the connection (S115).

The control unit 24 notifies the signal processing unit 23 of the signal processing unit settings (S409). The signal processing unit 23 performs route setting so that the terminal device 94 can use a network service via the connection identification unit 22 #2 (S116). After that, the signal processing unit 23 permits the communication connection with the terminal device 94 based on the notified signal processing unit settings.

As a result, only the terminal device 94 for which the connection is permitted is allowed to be communicatively connected to the connection identification unit 22 #2, the optical signal processing unit 21, the optical transmission line 93 in the optical subscriber line section, the optical signal processing unit 11, the network connection unit 13, and the network 95, so that the terminal device 94 can start using the network service (S117).

INDUSTRIAL APPLICABILITY

The present disclosure can be applied to the information and communication industries.

REFERENCE SIGNS LIST 11, 21 Optical signal processing unit
12, 24 Control unit
13 Network connection unit
22 Connection identification unit
23 Signal processing unit
25 Terminal connection unit
26 ID acquisition unit
90 PON system
91 OLT
92 ONU
93 Optical transmission line
94 Terminal
95 Network
96 Higher-level server
97 Router

The invention claimed is:

1. A communication network system comprising:
an optical network unit including
an ID acquisition unit that acquires ID information unique to a terminal device from the terminal device;
a virtual MAC address generation unit that generates a virtual MAC address for the optical network unit by using the acquired ID information;
a connection identification unit provided for each LLID (Logical Link ID), the connection identification unit that generates a logical path between the optical network unit and an optical line terminal by using the virtual MAC address generated by the virtual MAC address generation unit as a MAC address; and a signal processing unit that refers to a table in which the identification information acquired by the ID acquisition unit and the connection identification unit are associated with each other to pass, to the terminal device, data transmitted and received using the logical path generated by the connection identification unit; and an optical line terminal that acquires the LLID and the virtual MAC address of the connection identification unit from the connection identification unit included in the optical network unit along with an authentication request, and generates, when authentication for the terminal device is successful using the ID information included in the virtual MAC address, a logical path between the optical line terminal and the connection identification unit.

2. The communication network system according to claim 1, wherein the virtual MAC address generation unit generates the virtual MAC address by using information unique to the optical network unit and the ID information.

3. The communication network system according to claim 1, wherein the ID information includes at least one of SIM (Subscriber Identity Module), IMEI (International Mobile Equipment Identifier), telephone number, IMSI (International Mobile Subscriber Identity), ICCID (IC Card Identifier), host name, and serial number.

4. The communication network system according to claim 1, wherein the ID acquisition unit acquires a packet from a network device that transfers data transmitted from the terminal device, and reads the ID information from the packet.

5. A communication method for an optical network unit, the communication method comprising:

acquiring, by an ID acquisition unit of the optical network unit, ID information unique to a terminal device from the terminal device;

generating, by a virtual MAC address generation unit of the optical network unit, a virtual MAC address for an optical network unit by using the acquired ID information;

generating, by a connection identification unit of the optical network unit, a logical path between the optical network unit and an optical line terminal by using the generated virtual MAC address as a MAC address for an LLID (Logical Link ID); and referring to, by a signal processing unit of the optical network unit, a table in which the identification information acquired by the virtual MAC address generation unit and the LLID are associated with each other to pass, to the terminal device, data transmitted and received using the logical path generated by the connection identification unit; and acquiring, by the optical line terminal, the LLID and the virtual MAC address of the connection identification unit from the connection identification unit included in the optical network unit along with an authentication request, and generating, when authentication for the terminal device is successful using the ID information included in the virtual MAC address, a logical path between the optical line terminal and the connection identification unit.

6. The communication method of the optical network unit according to claim 5, further comprising:

acquiring, by the ID acquisition unit, a packet from a network device that transfers data transmitted from the terminal device; and reading, by the ID acquisition unit, the ID information from the packet.

* * * * *